(No Model.)
H. E. DEY.
SECONDARY BATTERY.
No. 473,146. Patented Apr. 19, 1892.
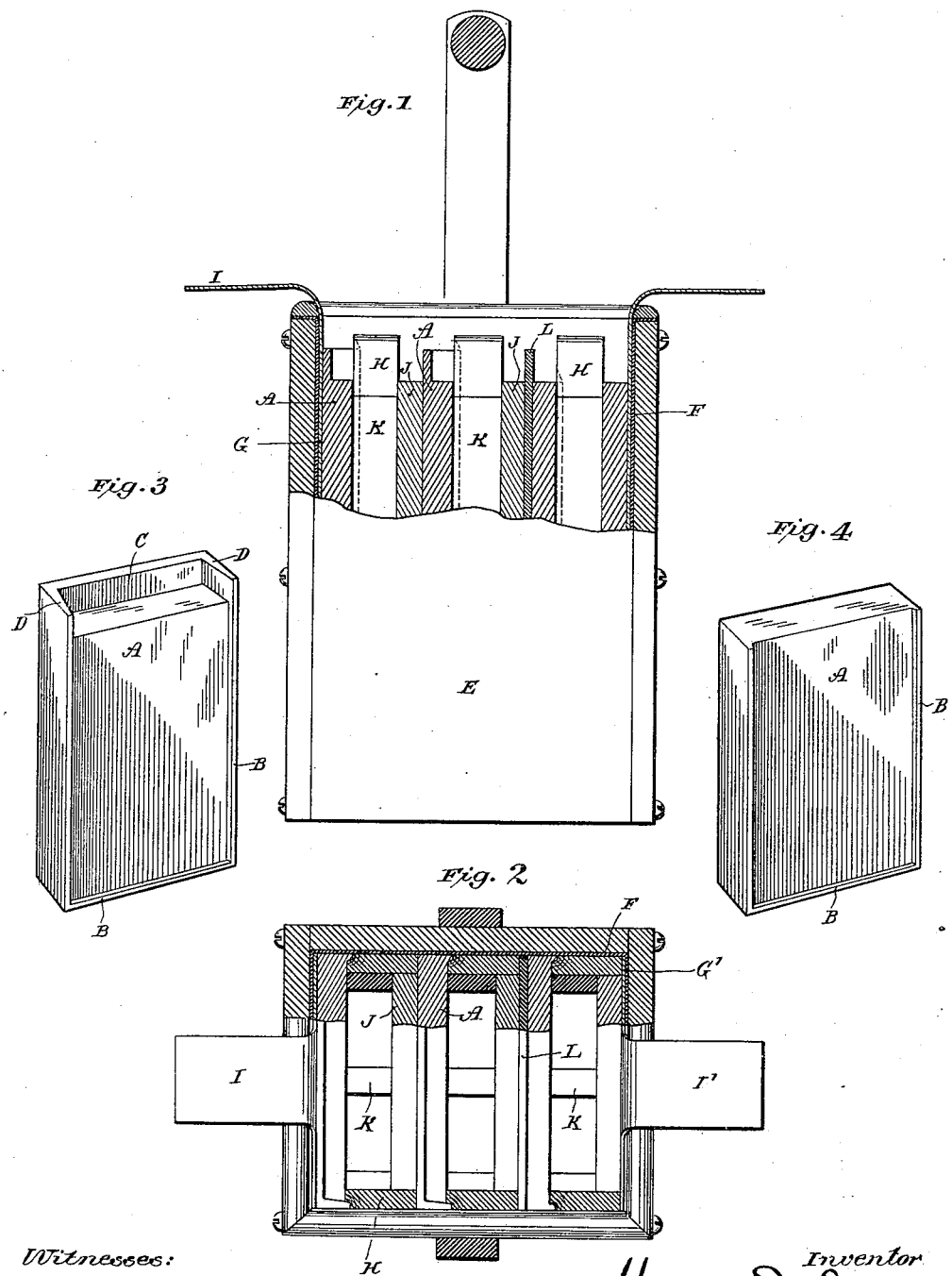
Witnesses:
Raphaël Netter
Ernest Hopkinson
Inventor
Harry E. Dey
by
Duncan & Page
Attorneys

UNITED STATES PATENT OFFICE.

HARRY E. DEY, OF NEW YORK, N. Y., ASSIGNOR TO PHŒBUS H. ALEXANDER, OF SAME PLACE.

SECONDARY BATTERY.

SPECIFICATION forming part of Letters Patent No. 473,146, dated April 19, 1892.

Application filed September 10, 1890. Renewed July 8, 1891. Serial No. 398,745. (No model.)

*To all whom it may concern:*

Be it known that I, HARRY E. DEY, a citizen of the United States, residing at New York, in the county and State of New York, have invented certain new and useful Improvements in Secondary Batteries, of which the following is a specification, reference being had to the drawings accompanying and forming a part of the same.

It is a well-known fact that an active material for secondary batteries—such as litharge, minium, or red lead—may be compressed in a grid or holder, and when, under proper conditions, it is treated by an electric current it is hardened or set, becoming a solid mass sufficiently coherent to remain attached to the holder. One method of thus hardening or setting such materials was invented and patented by me, and consists in packing the powdered material while dry into grids or holders, laying two or more of such holders together, with interposed sheets of fibrous material, to serve as a mechanical support for the active material, confining it in its place, and then treating the same electrically by passing a current through the material from one holder to the other. This method I employ in carrying out the process by which I make the plates for the battery, which forms the subject of this specification—that is to say, I produce the positive and negative plates by forming or treating in the manner above described powdered active material while compressed or packed in forms or molds of approximately the shape which the finished plate is to ultimately take.

The novel features of the invention reside in the method of producing the plates—in the finished negative plates—both in respect to their shape and composition and in the manner in which they are associated and combined with the other parts or elements of the battery.

Figure 1 in the accompanying drawings is a side elevation and part section of a battery constructed in accordance with my invention. Fig. 2 is a top plan and part perspective view of the same. Fig. 3 is a perspective view of one of the negative plates, and Fig. 4 is a similar view of a modification of the same.

The plate A in Fig. 3 is composed of a body of finely-divided or spongy lead, with raised or projecting edges or flanges B along the two sides and bottom and on one side or face only. The upper end also of the plate is formed with the raised edge or rib C, preferably flush with the rear face or side of the plate and the similar projecting edges D on each side. These plates are made by packing litharge in a form or receptacle of approximately the shape of the plate itself and then treating it by my process, as described above and in my patent, No. 418,703, dated January 7, 1890, until it is reduced to spongy lead. The plate is then removed from the form and subjected to pressure applied to the edges only. This is readily accomplished by means of any convenient form of collapsing or contracting mold or press, so that the main body of the plate is not materially affected by the pressure.

In order to preserve a flange or raised edge around the plate, the thickness of the plate along its edge when it comes from the mold or form should be sufficiently great to leave a raised edge, even in case pressure be applied thereto vertically or at right angles to the flat surface of the plates. Generally, however, I apply the pressure laterally to the edges—that is to say, the plate is confined between the two flat sides of a mold and the narrow sides or edges of the mold are forced inward toward the center of the plate. This has the effect of compacting or solidifying the edges of the plate only, as the material is of a consistency which does not convey the pressure to any great distance into the body of the plate. It will be understood that in the first form or mold the spaces for the thicker projecting portions B C D, which form the sides and raised edges of the finished plate, are made large enough to allow for the introduction of sufficient material to leave the proper thickness of edge after compression.

The parts of the treated plate, including the raised portions B C D and the faces of the top, bottom, and side edges of the plate, become, under pressure applied as above, solid lead, while the main body of the plate remains in the condition of finely-divided or spongy lead.

In the form of battery which I employ it is necessary that each cell be separated from the others by a perfectly water-tight partition, and in order to render the negative plates, when they alone are used as such partition, entirely water-tight I rub them after they are treated, and generally before they are taken from the first form or mold, with a rounded piece of hard rubber or other proper material over their flat and exposed surface. This smooths and compacts the back of the plate and renders it impervious to fluids. The back of the plate, or the side which is thus treated, is that against which the positive plate is brought into contact.

The positive plates are made by compressing or packing red lead or a mixture of litharge and red lead in a mold, treating it, and then removing it when coherent from the mold or receptacle. They are formed as simple cakes or blocks without the raised edges or other peculiar characteristics of the negative plates.

When I have made a sufficient number of the above-described plates positive and negative, I place them in a cell or box E, lined with rubber F or other insulating material. I may arrange them as follows: At one end of the cell or box, against the wall thereof, I lay a sheet of lead G with a tongue I for a terminal. Against this sheet I then lay a negative plate A with its smooth face toward the sheet. At the sides and bottom of the cell I then place rubber or other suitable strips or blocks H, the vertical or side blocks being of about the same height as the plates and of a width considered proper for the width or size of a single cell. Against the edges of these blocks H is then placed another negative plate, and in this manner the box is divided up into separate cells by partitions formed by the negative plates. The positive plates J are then slipped into the spaces between the negative plates and are held up against the smooth backs of the same by rubber or other strips K. The last positive plate of the series is held up against a lead sheet G' with a tongue I', which is laid against the side of the box. The edges of the negative plates, being of solid lead, withstand a heavy pressure, and hence the plates may be packed in firmly and securely to form perfectly water-tight compartments or cells. This is furthermore aided by the thin flanges or raised edges on the sides and bottom of the plates, which are embedded in the rubber or plastic blocks H, as shown, and serve to make better joints. The edges or flanges C D, extending up above the main body of the plates A, form partitions or dams between the several cells, over which the solution may not run.

The necessity of making the plates sufficiently non-porous to prevent the intermingling of the solutions of any two adjacent cells requires considerable care in their manufacture; but this I may readily obviate by interposing between the back of one negative plate and the solution or positive plate of the next cell a sheet of lead, as L, which forms a perfectly-water-proof partition. In such case the lead sheet may be higher than the plates, so that the upper raised edge C may be dispensed with, and the plate formed as shown in Fig. 4.

In lieu of using independent packing-strips or blocks H, as I have described herein, the said strips H may be integral with the rubber sheet lining the cell, forming ribs thereon, between which are grooves for the reception of the edges of the negative plates, as described in my patent, No. 418,700, dated January 7, 1890. In either event the plates and interposed rubber strips are forced together or clamped by the ends of the box, which are screwed to the sides, as shown.

This battery may be charged and used in the same manner as others and will be found efficient, economical, and durable. The number of plates or pairs may be increased at will, and any positive plate may be readily removed and replaced whenever occasion requires. A great merit of the construction lies in the greatly-reduced weight for a battery of given capacity as compared with the forms in general use.

What I now claim is—

1. A negative plate for secondary batteries, composed of finely-divided or spongy lead with compacted and projecting edges, as set forth.

2. A negative plate for secondary batteries, composed of finely-divided or spongy lead having its edges compressed or compacted and raised above one face, forming a flange or projecting edge along the sides and bottom of the plate, as set forth.

3. A negative plate for secondary batteries, composed of finely-divided or spongy lead with compressed or compacted and raised edges or flanges along the sides and bottom and a compressed rib along the top of the same, as set forth.

4. The combination of a series of negative plates composed of finely-divided or spongy lead with compacted and raised edges of rubber packing between the edges of said plates and forming the side walls of cells, as set forth.

5. In a secondary battery, the combination, with a box or case, of one or more partitions dividing the same into separate compartments or cells and composed of a negative plate of active material and a lead sheet, and rubber packing between the edges of said partitions, as set forth.

6. In a secondary battery, the combination, with a box or case, of one or more partitions dividing the same into separate compartments or cells, each partition being composed of a negative plate of active material with a raised edge or flange on one face and a lead sheet, and rubber packing between the lead sheet of one partition and the raised edge of the negative plate of the next, as set forth.

7. The method of making secondary-battery plates herein described, which consists in filling a conducting form or mold with one active material, such as litharge, then passing an electric current through the mold and the material therein until such material is formed or reduced to spongy lead, and then removing the plate or mass of active material from the mold, as set forth.

8. The method of making secondary-battery plates herein described, which consists in filling a form or mold with an active material, such as litharge, then treating the same, then removing the plate thus formed from the mold, and then compressing it laterally to form solid edges, as set forth.

HARRY E. DEY.

Witnesses:
ARTHUR H. SMITH,
ERNEST HOPKINSON.